United States Patent [19]

Bendl

[11] Patent Number: 4,548,415

[45] Date of Patent: Oct. 22, 1985

[54] ARTICULATED PIPE JOINT SEAL ASSEMBLY

[75] Inventor: Peter Bendl, Wolfratshausen, Fed. Rep. of Germany

[73] Assignee: Feodor Burgmann Dichtungswerke GmbH & Co., Wolfratshausen, Fed. Rep. of Germany

[21] Appl. No.: 565,580

[22] Filed: Dec. 27, 1983

[30] Foreign Application Priority Data

Dec. 28, 1982 [DE] Fed. Rep. of Germany ....... 3248417

[51] Int. Cl.⁴ .................... F16J 15/06; F16L 25/00
[52] U.S. Cl. .................................. 277/100; 277/101; 277/207 A
[58] Field of Search ............... 277/207, 167, 168, 169, 277/170, 100, 101, 5, 234

[56] References Cited

U.S. PATENT DOCUMENTS

| | | | |
|---|---|---|---|
| 2,249,127 | 7/1941 | Goetze | 277/234 |
| 3,188,115 | 7/1965 | Morrish et al. | 285/18 |
| 3,233,921 | 2/1966 | Holmgren et al. | 277/100 |

FOREIGN PATENT DOCUMENTS 549113 10/1956 Italy .................................. 277/101

1602989 11/1981 United Kingdom .

Primary Examiner—Robert I. Smith
Attorney, Agent, or Firm—Spencer & Frank

[57] ABSTRACT

A seal assembly for an articulated coupling of two pipes has a first flange adapted for affixation to the end of a first pipe, a first slide face on the first flange, and a second flange adapted for affixation to the end of a second pipe. The second flange has an annular part including an engagement face oriented towards the first flange and a tubular nipple projecting towards the first flange. The seal assembly further has a sheet metal ring surrounding the tubular nipple and having a generally U-shaped cross section for defining a ring cavity open towards the engagement face. A second slide face, provided on the outer surface of an outer wall portion of the sheet metal ring, is surrounded by, and is in a sliding contact with, the first slide face. An annular filler mass of a sealing material is received in the cavity. The filler mass extends axially beyond the sheet metal ring and is in contact with the engagement face of the annular part of the second flange. A force exerting arrangement presses the first and second slide faces axially to one another.

17 Claims, 5 Drawing Figures

ARTICULATED PIPE JOINT SEAL ASSEMBLY

BACKGROUND OF THE INVENTION

This invention relates to a seal assembly for providing an articulated connection between pipes, particularly hot exhaust gas pipes. The seal assembly is of the type which has a first flange affixed to the end of one pipe and provided with a first metallic slide face coaxial with the pipe axis. The seal assembly further has a second flange affixed to the end of the other pipe, a second metallic slide face which is held operationally stationarily on the second flange and is coaxial with the pipe axis. The second metallic slide face is surrounded by the first slide face and is in sliding engagement therewith. At least one of the two slide faces has a spherical annular surface. The seal assembly also includes a device which maintains the two slide faces in contact with one another with an axial bias.

In known seal assemblies of the above-outlined type the second metallic slide face is formed immediately at the second flange as a complemental convex spherical annular surface. The second flange is in contact with the first slide face directly or with the interposition of an elastic sealing member. Such seal assemblies are used in particular in conduits for pressurized fluid.

In case of hot exhaust gas pipes, in particular, exhaust pipes of internal combustion engines, it is known to form the second slide face on sealing rings supported on the second sealing flange. The sealing rings have metal fabric inserts which project from the surface.

In known seal assemblies problems have been encountered as concerns the durability and noise generation during relative pivotal motions of the two pipes. It has been found that these problems are rooted, particularly in hot pipes, in the so-called "slip-stick" effect on the relatively moving slide faces. The known measures for eliminating these difficulties, such as the use of graphite with or without an additional lubricant as the filler between the woven metal insert and further, the use of sacrificial (self exhausting) wires having superior sliding properties were not found to be satisfactory because of poor durability and/or high costs.

SUMMARY OF THE INVENTION

It is an object of the invention to provide an improved seal assembly of the above-outlined type which is economical to manufacture, which has a high durability and a minimum noise generation, particularly when used in coupling hot gas pipes.

This object and others to become apparent as the specification progresses, are accomplished by the invention, according to which, briefly stated, the seal assembly has a first flange adapted for affixation to the end of a first pipe, a first slide face on the first flange, and a second flange adapted for affixation to the end of a second pipe. The second flange has an annular part including an engagement face oriented towards the first flange and a tubular nipple projecting towards the first flange. The seal assembly further has a sheet metal ring surrounding the tubular nipple and having a generally U-shaped cross section for defining a ring cavity open towards the engagement face. A second slide face, provided on the outer surface of an outer wall portion of the sheet metal ring, is surrounded by, and is in a sliding contact with, the first slide face. An annular filler mass of a sealing material is received in the cavity. The filler mass extends axially beyond the sheet metal ring and is in contact with the engagement face of the annular part of the second flange. A force exerting arrangement presses the first and second slide faces axially to one another.

By virtue of the invention the second slide face may adapt itself to the shape of the first slide face to thus result in a superior sealing effect even if the slide faces deform under thermal effects. Because of such an elastic adaptability of the slide faces, manufacturing tolerances may be widened. The sheet metal ring further provides for a desired good metallic heat conductivity between the two flanges and thus - if the invention is used in an internal combustion engine - ensures a good heat transfer between connecting pipe and muffler.

The filler mass which is an elastic-plastic sealing material, performs several functions: it effectively dampens vibrations caused by relative oscillations of the two flanges; it seals the sheet metal ring with respect to the engagement face on the second flange and it exerts a resilient axial bias on the sheet metal ring. By virtue of the bias, in conjunction with the inherent springing effect of the sheet metal ring, the requirements concerning an axial bias of the two slide faces may be lowered and, in some instances, a spring arrangement may be entirely dispensed with. The filler mass further converts the axial biasing force introduced by the engagement faces of the flange to radially inwardly and outwardly oriented forces which lead to limited deformations of the inner and outer wall portions of the sheet metal ring whereby the seating of the inner wall portion on the tubular nipple and the adaptation (conforming) of the second slide face to the first slide face and thus the sealing effect are improved.

According to a further feature of the invention, the terminal edge of the inner wall portion of the sheet metal ring is axially recessed with respect to the terminal edge of the outer wall portion and the annular filler mass projects axially beyond the terminal edge of the inner wall portion and extends radially inwardly to the circumferential face of the tubular nipple. In this manner an additional sealing and an improvement in the noise suppression are ensured and also, tolerances of the tubular nipple and the inner wall portion of the sheet metal ring may be widened.

According to a further feature of the invention, the second slide face is complemental with the concave-spherical first slide face and engages the same over a large area. According to a modified emodiment, the second slide face may be formed on an annular bead disposed around the outer wall portion of the sheet metal ring and may be in a linear contact with the concave-spherical first slide face. Further, the second slide face may be of concave-spherical configuration in linear contact with the first slide face formed on an annular bead.

According to still another feature of the invention, the outer wall portion of the sheet metal ring has a plurality of openings externally of that zone of its slide face which is overlapped during operation by the first slide face (provided it has a spherical configuration in this zone of the slide face as well). The openings preferably have, within the earlier-noted zone of the slide face, a slot-shaped configuration extending in the circumferential direction and extend in several rows in an overlapping relationship from row to row. The openings situated externally of the noted zone of the slide face are slots lying preferably in radial planes of the sheet metal ring. By means of the slots the noise suppressing effect of the annular filler mass which preferably projects into the slots, is made more effective and further, the slots change the natural frequency of the sheet metal ring which results in a more tolerable sound. In addition, deposits on the slide faces may be prevented more effectively.

DESCRIPTION OF THE PREFERRED EMBODIMENTS

Figure 1:
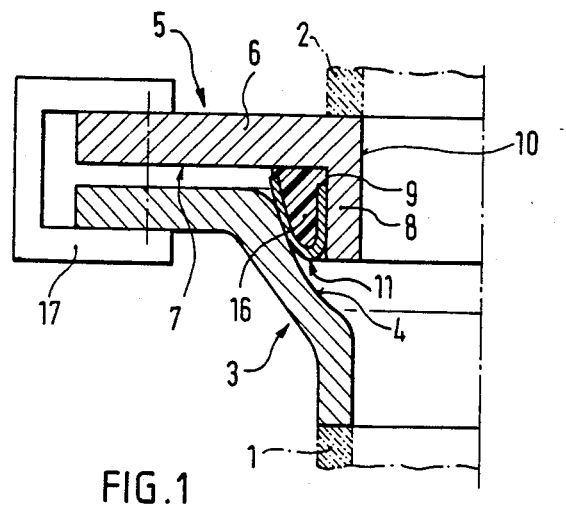
FIG. 1 is an axial sectional view of a preferred embodiment of the invention.
Figure 2:
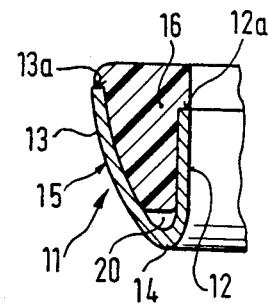
FIG. 2 is an axial sectional view, on an enlarged scale, of a detail of FIG. 1.

In a first preferred embodiment illustrated in FIGS. 1 and 2, the pipes 1 and 2 to be coupled by the seal assembly according to the invention are shown in phantom lines. The pipe 1 is, for example, by means of a weld, bonded to a first flange 3 which has a first metallic slide face 4 coaxial with the axis of the pipe 1 and having a concave-spherical annular surface.

A second flange 5 is secured, for example, by welding, to the pipe 2. The flange 5 comprises an annular part 6 having a radially oriented engagement face 7 and a tubular nipple 8 which projects therefrom and which has a cylindrical external circumferential surface 9 and an axial opening 10 adapted to the inner diameter of the pipe 2. On the tubular nipple 8 there is inserted a cross-sectionally U-shaped sheet metal ring 11 which has a tubular inner wall portion 12, a spherically arcuate outer wall portion 13 and an intermediate wall portion 14 which connects the wall portions 12 and 13 and which has approximate configuration of a semi-circular hollow ring. The terminal edge 13a of the outer wall portion 13 axially projects beyond the terminal edge 12a of the inner wall portion 12. Both terminal edges 12a and 13a are axially spaced from the engagement face 7. On the outer circumference of the outer wall portion 13 there is formed a second slide face 15 which is complemental to the first slide face 4 such that the two metallic slide faces are in a face-to-face contacting relationship.

The hollow space of the sheet metal ring 11 is filled with an annular filler mass 16 which is an elastic or elastic-plastic sealing material. The filler mass 16 may be a preformed annulus and the filler mass material may be graphite, mineral materials (or a mixture of the two), a metal and/or non-metal fiber mesh or felt. For certain applications the filler mass does not occupy completely the hollow space of the sheet metal ring 11 but leaves an annular space 20 therein in the region surrounded by the intermediate wall portion 14. Or, in the alternative, the annular space 20 may be filled with a filler mass having different properties as compared to the filler mass 16, for example, it may have a particularly high elasticity while its sealing properties - in case the sheet metal ring has no openings in this zone (contrary to other embodiments to be discussed later) - may be less outstanding. The filler mass 16 projects axially beyond the two terminal edges 12a and 13a of the sheet metal ring 11 and is in contact with the engagement face 7 of the annular part 6. The filler mass 16 also extends - at least in its installed state - beyond the terminal edge 12a radially inwardly to the outer circumferential surface 9 of the tubular nipple 8.

The flanges 3 and 5 are held together by an only symbolically shown device 17. The device 17 which exerts an axial pressing force on the flanges 3 and 5 may comprise only usual flange bolts thereby utilizing from the springing properties of the filler mass 16; the device 17, however, should expediently have springing properties in order to ensure a reliable seal under all operational conditions.

Figure 3:
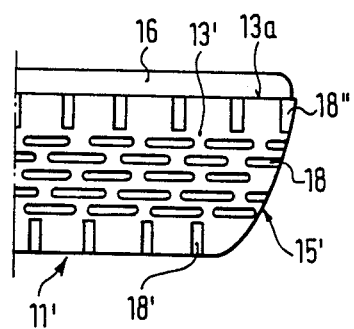
FIG. 3 is a side elevational view, on an enlarged scale, of a variant of a detail of FIG. 1.

According to a further preferred embodiment of the invention, the solid-wall (i.e. not perforated) sheet metal ring 11 shown in FIGS. 1 and 2 is replaced by a sheet metal ring 11' (FIG. 3) which has a convex-spherical slide face 15' at an outer wall portion 13'. The latter is complemental with the concave-spherical first slide face 4 and has in that zone of the slide face 15' which during operation is overlapped by the slide face 4, a plurality of slot-shaped perforations 18. The slots 18 are oriented in the circumferential direction of the sheet metal ring 11' and are arranged in a plurality of rows. As viewed in the axial direction, slots of successive rows are arranged in a staggered relationship with respect to one another. Further, externally of the above-noted zone of the second slide face 15' there are provided additional slots 18', 18" which lie, with their longitudinal axes, in radial planes of the sheet metal ring 11'. The slots 18" adjoining the terminal edge 13a of the sheet metal ring 11' are open towards that terminal edge. This arrangement results in a resilient outer wall portion 13'. The annular filler mass 16 extends into the slots 18, 18' and 18".

Figure 4:
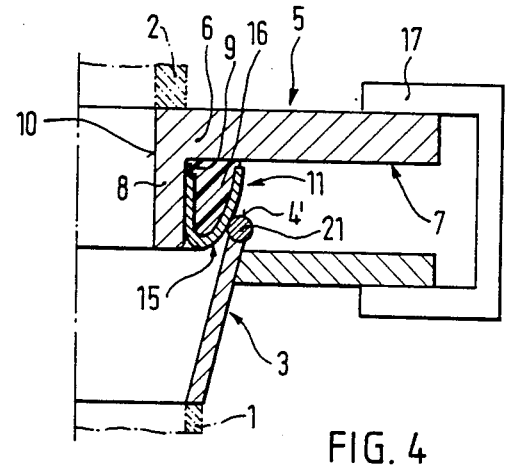
FIG. 4 is an axial sectional view of a further preferred embodiment of the invention.

Turning now to FIG. 4, there is illustrated a further preferred embodiment which comprises a non-perforated sheet metal ring having a convex-spherical second slide face 15 engaging a first slide face 4' which is not complemental therewith and which is formed on an annular bead 21 of the flange 3. Accordingly, the slide faces 4' and 15 are in a linear - rather than in a face-to-face - contact with one another. According to a modification, externally of that zone of the slide face 15 of the sheet metal ring 11 which is in engagement with the slide face 4' there are provided openings similar to those designated at 18' and 18" in FIG. 3. It is noted that slots comparable to the openings 18 of the FIG. 3 structure are not provided.

Figure 5:
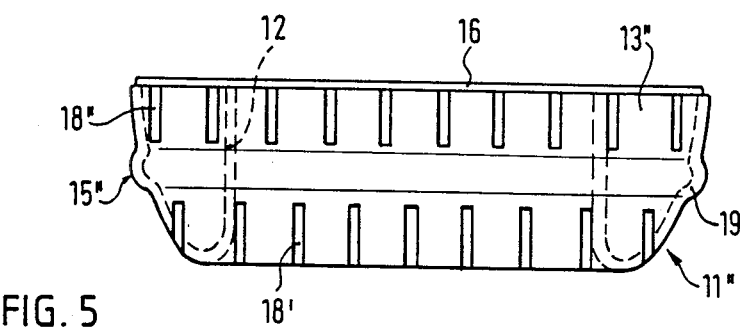
FIG. 5 is a side elevational view, on an enlarged scale, of a variant of a detail of FIG. 4.

Turning now to FIG. 5, in a further preferred embodiment shown therein, a line contact occurs between the two slide faces by virtue of the use of a sheet metal ring 11" in an arrangement otherwise similar to that shown in FIG. 1. The second slide face 15" of the sheet metal ring 11" is formed on an annular bead 19 of the outer wall portion 13". Slots 18' and 18" similarly to those of the FIG. 3 structure may be provided.

It will be understood that the above description of the present invention is susceptible to various modifications, changes and adaptations, and the same are intended to be comprehended within the meaning and range of equivalents of the appended claims.

What is claimed is:

1. A seal assembly for an articulated coupling of a first and a second pipe each having a pipe end and a pipe axis, comprising
   (a) a first flange having a flange axis and being adapted for affixation to the pipe end of said first pipe in axial alignment therewith;

(b) a first slide face on said first flange in a coaxial relationship therewith;

(c) a second flange having a flange axis and being adapted for affixation to the pipe end of said second pipe in axial alignment therewith; said second flange having
  (1) an annular part including an engagement face situated at least approximately in a radial plane of said second flange and being oriented towards said first flange and
  (2) a tubular nipple projecting axially from said annular part towards said first flange and having an at least approximately cylindrical outer circumferential surface;

(d) a sheet metal ring surrounding said tubular nipple and having a generally U-shaped cross section for defining a ring cavity open towards said engagement face; said sheet metal ring having
  (1) an inner annular wall portion having an outer surface being in circumferential engagement with said tubular nipple and having a terminal edge axially spaced from said engagement face and
  (2) an outer annular wall portion having an outer surface and a terminal edge axially spaced from said engagement face;

(e) a second slide face on said outer surface of said outer wall portion of said sheet metal ring; said second slide face being coaxial with said second flange and being surrounded by, and being in a sliding contact with, said first slide face;

(f) an annular filler mass of a sealing material received in said cavity; said annular filler mass extending axially beyond the terminal edges of said inner and outer annular wall portions and being in contact with said engagement face; and (g) force exerting means for pressing said first and second slide faces axially to one another.

2. A seal assembly as defined in claim 1, wherein said terminal edge of said inner wall portion is at a greater axial distance from said engagement face than the terminal edge of said outer wall portion and further wherein said filler mass extends radially inwardly beyond the terminal edge of said inner wall portion to said cylindrical outer circumferential surface of said tubular nipple.

3. A seal assembly as defined in claim 1, wherein said first slide face has a concave-spherical annular configuration and said second slide face has a convex-spherical annular configuration conforming to said first slide face and being in a surface-to-surface engagement therewith.

4. A seal assembly as defined in claim 1, wherein said first slide face has a concave-spherical annular configuration and further wherein said sheet metal ring has, on said outer surface of said outer wall portion, a circumferential bead on which said second slide face is formed; said second slide face being in a circumferential linear contact with said first slide face.

5. A seal assembly as defined in claim 1, wherein said second slide face has a convex-spherical annular configuration and further wherein said first flange has a circumferential bead on which said first slide face is formed; said first slide face being in a circumferential linear contact with said second slide face.

6. A seal assembly as defined in claim 1, wherein said outer wall portion of said sheet metal ring has a plurality of slot-shaped perforations externally of contact areas between said first and second slide faces.

7. A seal assembly as defined in claim 6, wherein said filler mass projects into said slot-shaped perforations.

8. A seal assembly as defined in claim 1, wherein said outer wall portion of said sheet metal ring has a plurality of slot-shaped perforations within contact areas between said first and second slide faces; said second slide face having a spherical annular configuration.

9. A seal assembly as defined in claim 8, wherein said filler mass projects into said slot-shaped perforations.

10. A seal assembly as defined in claim 1, wherein said sheet metal ring further comprises an annular connecting wall portion joining said inner and outer annular wall portions to one another and oriented towards said first flange; said filler mass bounds an empty annular space forming part of said cavity and being situated adjacent said annular connecting wall portion.

11. A seal assembly as defined in claim 1, wherein said filler mass is a preformed ring.

12. A seal assembly as defined in claim 1, wherein said filler mass in graphite.

13. A seal assembly as defined in claim 1, wherein said filler mass is a mineral.

14. A seal assembly as defined in claim 1, wherein said filler mass is a mesh of metal fibers.

15. A seal assembly as defined in claim 1, wherein said filler mass is a mesh of non-metallic fibers.

16. A seal assembly as defined in claim 1, wherein said filler mass is a felt of metal fibers.

17. A seal assembly as defined in claim 1, wherein said filler mass is a felt of non-metallic fibers.

* * * * *